United States Patent
Boel et al.

[15] 3,676,413
[45] July 11, 1972

[54] PROCESS FOR THE POLYMERIZATION AND COPOLYMERIZATION OF VINYL MONOMERS AND THE RESIN COMPOSITIONS OBTAINED THEREBY

[72] Inventors: Michel Boel, Rosignano-Solvay, Italy; Roger Dechenne, Strombeek, Belgium

[73] Assignee: Solvay & Cie., Brussels, Belgium

[22] Filed: June 22, 1970

[21] Appl. No.: 48,184

[30] Foreign Application Priority Data

June 24, 1969 France..................................6921207
Dec. 22, 1969 France..................................6944530

[52] U.S. Cl............................260/87.5, 260/86.3, 260/87.1, 260/87.5, 260/87.7, 260/88.7, 260/89.1, 260/89.5, 260/92.8, 260/93.5
[51] Int. Cl..........................................C08f 1/04, C08f 3/30
[58] Field of Search.....................260/88.7, 89.5, 92.8, 93.5, 260/87.5, 87.7, 87.1, 86.3

[56] References Cited

UNITED STATES PATENTS 2,345,659 4/1944 Downes..................................260/92.8
2,961,432 11/1960 Fikentscher et al. ..................260/92.8
3,475,398 10/1969 Jobard....................................260/92.8
3,538,067 11/1970 Bognar...................................260/92.8

FOREIGN PATENTS OR APPLICATIONS 1,124,237 8/1968 Great Britain

OTHER PUBLICATIONS

Bovey et al., Emulsion Polymerization, Interscience Publishers, N.Y., (1955) pages 67, 68, 70, 71

Primary Examiner—Joseph L. Schofer
Assistant Examiner—Edward J. Smith
Attorney—Robert E. Burns and Emmanuel J. Lobato

[57] ABSTRACT

Vinyl monomers are polymerized and copolymerized in mass or in the gaseous phase in the presence of a water-soluble polymerization catalyst which is mixed with an inert support material and water in a small amount, such that the resin product varies in consistency from a powder to a moist cake. High yields of polymer is a desirable form are obtained by this process. Further, the support material is completely embedded in the resultant polymer, so that if the catalyst support is a reinforcing agent, in compounds which are reinforced may be obtained by this process.

6 Claims, 1 Drawing Figure

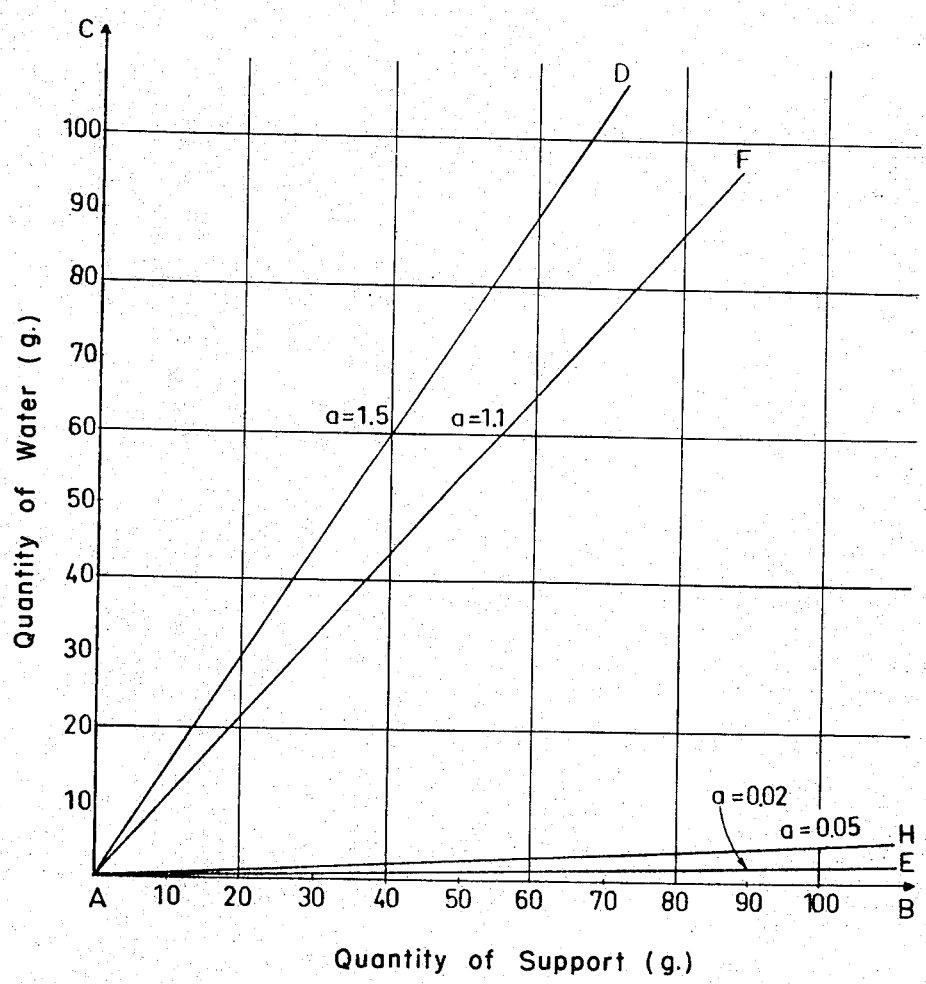

3,676,413

PROCESS FOR THE POLYMERIZATION AND COPOLYMERIZATION OF VINYL MONOMERS AND THE RESIN COMPOSITIONS OBTAINED THEREBY

BACKGROUND OF THE INVENTION

The present invention concerns a process for the polymerization and for the copolymerization of vinyl monomers in mass or in the gaseous phase and to the resinous compounds obtained thereby.

It is well known that mass or bulk polymerization processes, for example, in accordance with German Pat. No. 579,048, dated June 15, 1938 and in the gaseous phase, in accordance with Belgian Pat. No. 686,088, dated Aug. 29, 1966 which corresponds to copending U.S. Pat. Application Ser. No. 663,540, filed Aug. 28, 1967, now abandoned have advantages over the known procedures of polymerization in aqueous emulsion, for example, as described in French Pat. No. 746,969, dated Dec. 6, 1932 and in aqueous suspension, as described for example in British Pat. No. 427,494, dated Oct. 25, 1933.

Among the advantages of mass and gas phase polymerization of vinyl monomers is the fact that the polymer is obtained directly in the form of a powder without further processing such as precipitation, filtration, drying and so forth. In addition a pure polymer is obtained due to the absence of emulsifiers or dispersants which are employed in emulsion polymerization and polymerization in aqueous suspension respectfully.

However, procedures involving the polymerization in mass and in the gas phase also have certain inconveniences and disadvantages. In particular, the only initiators for mass and gas phase polymerization which have been available are catalysts which are soluble in the monomer, such as organic peroxides. After polymerization, catalytic residues are found intimately mixed with the polymer and these are quite difficult to eliminate. Such residues when allowed to remain in the polymer have an unfavorable influence on the thermal stability of the resin product.

By use of water-soluble catalysts, it would be possible to remedy this undesirable aspect of gas phase and mass polymerization, in view of the fact that the residues of such catalysts are generally not particularly harmful to the polymer and moreover, if desired, could easily be separated. However, water-soluble catalysts currently employed for polymerization of vinyl monomers in aqueous emulsion have been found to be completely ineffective for polymerization in mass and in the gas phase.

SUMMARY OF THE INVENTION

A process has now been discovered for the polymerization and for the copolymerization of vinyl monomers in mass as well as in the gaseous phase by means of water-soluble catalysts.

It has been found, unexpectedly, that water-soluble catalysts are effective to initiate the polymerization of vinyl polymers in mass polymerization and in polymerization in the gaseous phase when the catalyst is combined with a small quantity of water, the quantity being such that the solid product obtained as a result of the polymerization is able to absorb the water and retain a consistency which may vary from powder to a moist cake.

It has also been found, according to the invention, that gas phase and mass polymerization of vinyl monomer with a water-soluble catalyst is most effective when the interface of the catalyst is as extended as possible and that this is preferably achieved by using a supported catalyst.

Thus, according to the present invention, the polymerization and copolymerization of vinyl monomers is carried out in mass or in the gaseous phase in the presence of a water-soluble catalyst which is mixed with an inert support and a small quantity of water such that the polymer product is obtained in a consistency which may vary from powder to a moist cake.

The support material may be a reinforcing material for the resin, and reinforced resin products may thereby be obtained.

BRIEF DESCRIPTION OF THE DRAWING

The FIGURE is a diagram upon which the axis AB corresponds to the amount of support employed in grams and the axis AC to the amount of water in grams; the lines AD, AE, AF and AH define the gravimetric ratios (a) of the amount of water with respect to the amount of support. The lines AD and AE wherein (a) is 1.5 and 0.05 respectively define the limits of the ratio of the weight of water to the weight of support in the catalytic system according to the present invention; the lines AF and the lines AH define the preferred limits of the ratio of the weight of water to the weight of support in the catalytic system according to the present process.

DESCRIPTION OF THE INVENTION

According to the present invention, it has been found that the polymerization of vinyl monomers can be carried out in the gaseous phase and in mass by means of a water-soluble polymerization catalyst, of the type generally employed for emulsion and aqueous suspension polymerization, providing that the catalyst is combined with a small amount of water. However, it has also been found that in order for the polymerization to be initiated sufficiently and effectively, it is necessary that the interface between the catalyst and the vinyl monomer be as extended or spread out as possible. The catalyst employed in the present process is insoluble in the monomers undergoing polymerization, so that it is likely that polymerization takes place only at the interface of the immiscible phases, i.e. the monomer phase and the catalytic phase.

In order to achieve an extended dispersion of the catalytic phase in the monomeric phase, it has been found most effective to use a supported catalyst.

The catalytic support material used in the present process may be of any nature provided it does not have an inhibitory effect on the polymerization. Thus, the supports may be selected from those currently employed for this purpose, such as colloidal silica, calcium carbonate, glass fibers, nylon fibers and asbestos fibers. After polymerization, the support material is completely embedded in the resultant polymer. In this manner and according to the present invention, polymers may be produced which are reinforced or strengthened by various reinforcing materials. The support may also be a polymer of any type, most preferably in finely divided form, and particularly the polymer product resulting from polymerization or copolymerization according to the present process.

The particle size of the support material is of no importance and the support material may be in the form of powder, granules and fibers. Further, the ratio of support material to monomer is of no importance in the present process; in fact, the present process may be carried out without support material, however, the process is more effective when a support is used.

However, it has been found that in order to retain some of the principal advantages of polymerization in mass and in the gaseous phase, the ratio of water to the support material, i.e. parts by weight of water to parts by weight of support, should be between about 0.02 and 1.5.

When polymerization is carried out according to the present invention, it is not necessary that the polymers be precipitated or separated from the reaction medium in view of the fact that the product is obtained directly in the form of a solid with a consistency which may vary from a powder to a moist cake. On the other hand, depending on the specific quantity of water used, drying may not be required at all, or with respect to a moist cake, a light drying is sufficient. Moreover, the polymers obtained by the present process have the particular advantage of being free of harmful, noxious, organic, catalytic residues which, when present, are difficult to eliminate.

The catalysts which are employed in the present process are the water-soluble polymerization catalysts which are currently used in aqueous emulsion polymerization of vinyl monomers. In general, water-soluble peroxide catalysts are employed, preferably inorganic peroxides or peroxide systems such as those described by Bovey et al. in Emulsion Polymerization, Interscience Publishers, Inc., New York, 1955, on pp. 65–81, which reference is incorporated herein. Persulfate, perborate and percarbonate salts are preferred, particularly the alkali metal and ammonium salts thereof.

In general, about 0.05 to 5 percent by weight and more preferably from 0.1 to 2.5 percent by weight of catalyst is used based on the weight of monomer in the present process.

The present method of polymerization in the presence of a supported catalyst will be further described with reference to the diagram of the attached figure.

In this diagram, the axis AB corresponds to the quantity in grams of the support and the axis AC to the quantity in grams of the water used in the catalyst system according to the present invention. The lines AD, AE, AF and AH correspond to constant gravimetric ratios (a) which define the quantity of water in grams with respect to the quantity of support in grams, wherein (a) is equal to 1.5, 0.02, 1.1 and 0.05, respectively, for the lines AD, AE, AF and AH. The lines AD and AH define the limits of the ratio of the parts by weight of water to the parts by weight of support in the catalytic system according to the present process, while AF and AH define the more preferred limits thereof. Thus, the ratio of the parts by weight of water to the parts by weight of support is such that it must be on or between the lines AD and AE or more preferably, on or between the lines AF and AH.

For a ratio greater than 1.5, the polymer produced is generally not a powder or a cake. If the rate of conversion is low, and a ratio of water to support greater than 1.5 is used, the polymer may be obtained in the form of soup or at best as a suspension or in aqueous latex, which then must be subjected to the operations of precipitation, separation and intensive drying. In this case, the advantages of polymerization in mass or in the gaseous phase are lost.

If the ratio of water to support is below 0.02, the rate of conversion of vinyl compound into polymer becomes insignificant and the polymerization process is impractical.

The process of the present invention is applicable to polymerization and to copolymerization of vinyl monomers wherein the polymerization is carried out in mass and in the gaseous phase. Vinyl chloride, vinyl acetate, styrene, acrylonitrile and alkyl acrylates and methacrylates may be mentioned among the vinyl compounds which are desirably polymerized according to the present invention. The present process is especially desirable for the preparation of the homopolymers of vinyl chloride and copolymers of vinyl chloride which contain at least a major proportion of vinyl chloride. In particular, vinyl chloride may be copolymerized with vinylidene halides, such as vinylidene chloride, vinyl esters, such as vinyl acetate, aromatic vinyl monomers, such as styrene, acrylic monomers such as acrylonitrile, alkyl acrylates and methacrylates, and olefins in general, such as ethylene, propylene, butene-2, chlorinated olefins, such as vinyl fluoride and vinylidene fluoride.

Aside from the new and improved catalytic system used according to the present invention, any known procedure of mass polymerization or polymerization in the gaseous phase can be used within the scope of the present invention. For example, the procedure for polymerization in mass as described in German Pat. No. 579,048, dated June 15, 1928, may be employed or the process of polymerization in the gaseous phase, described in Belgian Pat. No. 686,088, dated Aug. 29, 1966, may be employed.

When operating in mass or bulk, the polymerization pressure is equal to or greater than the saturated vapor pressure of the monomer undergoing polymerization. The saturated vapor pressure of course depends upon the operating temperature. In the case of the mass polymerization of vinyl chloride, for example, it is preferable to operate at about 40° to 80° C. and under a pressure such that the ratio of the polymerization pressure (kg./sq.cm.) to the saturated vapor pressure (km/sq.cm.) is equal to or greater than 1.

On the contrary, when polymerization is carried out in the gaseous phase, the operating pressure is lower than the saturated vapor pressure of the monomer at the temperature of polymerization. Thus, the polymerization of vinyl chloride in the gaseous phase is preferably carried out at about 40° to 80° C. wherein the relative pressure (defined by the above-mentioned ratio) is greater than 0.45 but lower than 1.

The following examples further illustrate the best mode currently contemplated for carrying out the present invention; however, the examples must not be construed as limiting the scope of the invention in any manner. Examples which include the letter "R" have been included for purposes of comparison and do not illustrate the present invention.

EXAMPLE 1R

Ammonium persulfate in an amount of 2.5 g. is introduced into a polymerization autoclave having a capacity of 1 l. and equipped with a stirring apparatus. The air contained in the autoclave is eliminated by means of a vacuum and it is replaced with nitrogen until an effective pressure, (i.e. (i.e. pressure above atmospheric pressure of 0.6 kg./sq.cm. is reached. Immediately prior to the introduction of the monomer, the autoclave is again placed under vacuum. Then, 450 g. of liquid vinyl chloride are introduced and the mixture is heated at 55° C. and stirred at 250 r.p.m.

The operation is carried out under an effective pressure of 8.1 kg./sq.cm., that is, just above the saturated vapor pressure of the vinyl chloride at 55° C., i.e. 8 kg./sq.cm.

After 7 hours under the above-mentioned conditions and after degassing, it was found that no polymer had been produced.

This example shows clearly that in the absence of water, a water-soluble catalyst is completely ineffective for the mass polymerization of vinyl chloride

EXAMPLES 2 to 4

These examples refer to the polymerization of vinyl chloride in mass in accordance with the process of the present invention. The operation is carried out in the same manner as Example 1R. The operating conditions and the results are set forth in Table 1 shown hereinafter.

TABLE 1

| Conditions of Operation and Results | | Ex. | 2 | 3 | 4 |
|---|---|---|---|---|---|
| Vinyl chloride | | g. | 445 | 440 | 445 |
| Catalytic System | Ammonium persulfate g. | | 2.5 | 0.5 | 0.5 |
| | Water | g. | 2 | 2 | 80 |
| Conditions of Polymerization | Temperature | °C. | 55 | 55 | 55 |
| | Effective pressure kg./sq.cm. | | 8.1 | 8.1 | 8.1 |
| | Speed of agitation r.p.m. | | 250 | 2000 | 2000 |
| | Period of polymerization | h. | 7 | 3 | 3 |
| Polymer Product | Quantity | g. | 33.5 | 11 | 25 |
| | Consistency | | powder, without free water | | |

EXAMPLES 5 to 23, 24R and 25R

Examples 5 to 23 involve the mass polymerization of various vinyl monomers in accordance with the process of the present invention in the presence of a catalyst system composed of an aqueous solution of a water-soluble catalyst which has been permeated on an inert support.

In these examples, the catalytic system is prepared in the following manner: The support is introduced into a cylindrical round-bottom container equipped with agitating means; after the support has been mixed, the aqueous solution of the catalyzer is introduced drop by drop; the mixture obtained in this manner is then agitated over a period of a few minutes in order to obtain a homogeneous mixture. Then, the operation is carried out in the same manner as in Example 1.

Examples 24R and 25R are provided for purposes of comparison. In these examples, polymerization has been carried out under the same conditions as in Examples 5 to 23, but the ratio of water/support is respectively, 4 and 3:9, i.e. outside that of the catalyst system used in the process of the invention. Under these conditions, the resulting polymer is an aqueous souplike mixture requiring separation and drying treatments, which is contrary to the result sought by the present process.

The operating conditions and the results of these examples are set forth in Table 2.

The catalytic system is prepared as described in Examples 5 to 25R.

The operation is carried out in the same manner as Example 1R until the final application of vacuum to the autoclave After this step, instead of introducing liquid vinyl chloride, gaseous vinyl chloride is introduced while agitation is maintained in the autoclave until an effective pressure of 1 kg./sq.cm. is reached. The temperature of the mixture in the autoclave is increased until the operating temperature is reached while the mixture is constantly agitated. The polymerization autoclave

TABLE 2

| Examples | 5 | 6 | 7 | 8 | 9 | 10 | 11 | 12 | 13 | 14 | 15 | 16 |
|---|---|---|---|---|---|---|---|---|---|---|---|---|
| Conditions of operation and results: | | | | | | | | | | | | |
| Monomer, g.: | | | | | | | | | | | | |
| Vinyl chloride | 450 | 450 | 450 | 450 | 675 | 455 | 450 | 450 | 450 | | | |
| Propylene | | | | | | | | | | 25 | | |
| Styrene | | | | | | | | | | | 460 | |
| Methyl methacrylate | | | | | | | | | | | | 400 |
| Acrylonitrile | | | | | | | | | | | | |
| Catalyst system: | | | | | | | | | | | | |
| Ammonium persulfate, g | 0.5 | 2.5 | 2.5 | 2.5 | 2.5 | 2.5 | | | 0.5 | 0.5 | 0.5 | 0.5 |
| Sodium perborate, g | | | | | | | 0.35 | | | | | |
| Sodium percarbonate, g | | | | | | | | 0.25 | | | | |
| Water, g | 20 | 7.5 | 48 | 8 | 8 | 18 | 20 | 20 | 20 | 20 | 20 | 20 |
| Support, g.: | | | | | | | | | | | | |
| Colloidal silica | 47 | 47 | 47 | | | | 47 | 47 | 47 | 47 | 47 | 47 |
| Fiber glass | | | | 130 | | | | | | | | |
| Asbestos fibers | | | | | | | | | | | | |
| Nylon fibers | | | | | | 45 | | | | | | |
| Precipitated calcium carbonate | | | | | 50 | | | | | | | |
| Ratio of weight of water to weight of support | | | | | | | | | | | | |
| Conditions of polymerization: | | | | | | | | | | | | |
| Temperature, °C | 55 | 55 | 55 | 55 | 55 | 55 | 55 | 55 | 55 | 55 | 55 | 55 |
| Effective pressure, kg./sq.cm | 8.1 | 8.1 | 8.1 | 8.1 | 8.1 | 8.1 | 8.1 | 8.1 | 9.2 | 0.9 | 0.9 | 0.9 |
| Speed of agitation, r.p.m | 250 | 250 | 250 | 250 | 250 | 250 | 250 | 250 | 250 | 250 | 250 | 250 |
| Period of polymerization, h | 3 | 3 | 1.67 | 3 | 3 | 3 | 3 | 3 | 3 | 3 | 1.92 | 3 |
| Type of procedure | Mass | Mass | Mass | Mass | Mass | Mass | Mass | Mass | Mass | Mass | Mass | Mass |
| **Polymer product *:** | | | | | | | | | | | | |
| Total quantity, g | 49.5 | 146.5 | 69.5 | 100 | 233 | 20.5 | 18.5 | 21 | 38 | 6 | 25.5 | 114.5 |
| Quantity per hour, g./h | | | | | | | | | | | | |
| Appearance | Powder without free water | | | | | | | | | | | |

| Examples | 17 | 18 | 19 | 20 | 21 | 22 | 23 | 24R | 25R |
|---|---|---|---|---|---|---|---|---|---|
| Conditions of operation and results: | | | | | | | | | |
| Monomer, g.: | | | | | | | | | |
| Vinyl chloride | 450 | 450 | 450 | 450 | 450 | 1,350 | 150 | 1,350 | 412 |
| Propylene | | | | | | | | | |
| Styrene | | | | | | | | | |
| Methyl methacrylate | | | | | | | | | |
| Acrylonitrile | | | | | | | | | |
| Catalyst system: | | | | | | | | | |
| Ammonium persulfate, g | 2.5 | 2.5 | 2.5 | 2.5 | 2.5 | 2 | 2 | 2 | |
| Sodium perborate, g | | | | | | | | | |
| Sodium percarbonate, g | | | | | | | | | |
| Water | 2.5 | 3.5 | 13.2 | 15 | 45 | 20 | 15 | 581 | 1500 |
| Support, g.: | | | | | | | | | |
| Colloidal silica | 47 | 47 | 47 | 47 | 47 | | | 145 | 378 |
| Fiber glass | | | | | | | | | |
| Asbestos fibers | | | | | | 30 | 135 | | |
| Nylon fibers | | | | | | | | | |
| Precipitated calcium carbonate | | | | | | | | | |
| Ratio of weight of water to weight of support | 0.053 | 0.074 | 0.28 | 0.319 | 0.946 | 0.666 | 0.111 | 4 | 3 |
| Conditions of polymerization: | | | | | | | | | |
| Temperature, °C | 55 | 55 | 55 | 55 | 55 | 55 | 55 | 55 | 55 |
| Effective pressure, kg./sq.cm | 8 | 8 | 8 | 8 | 8 | 8 | 8 | 8 | 8 |
| Speed of agitation, r.p.m | | | | | | | | | |
| Period of polymerization, h | 3 | 3 | 2.78 | 2 | 1.67 | 3.5 | 2 | 2.5 | 2.5 |
| Type of procedure | Mass | Mass | Mass | Mass | Mass | Mass | Mass | Aqueous mixture | |
| **Polymer product*:** | | | | | | | | | |
| Total quantity, g | 11.5 | 24.5 | 128 | 82.5 | 92.2 | 125 | 82.5 | 153.5 | 162 |
| Quantity per hour, g./h | 3.8 | 8.2 | 46.1 | 41.2 | 55.2 | 35.7 | 41 | 61.5 | 64.8 |
| Appearance | Powder without free water | | | | | | | Soupy | Soupy |

*Quantity of support deducted.

EXAMPLES 26 to 33

These examples involve a number of gaseous phase polymerizations of vinyl chloride in accordance with the process of the present invention wherein a catalyst system containing an aqueous solution of water-soluble catalyst and a support are employed.

is connected to an autoclave filled with monomer maintained at a temperature which is from 2° to 3° C. lower than the polymerization temperature. The transfer of the monomer is effected gradually as the polymerization in gaseous form takes place to maintain the desired pressure in the autoclave. The operation conditions and the results of the polymerization are set forth in Table 3.

TABLE 3

| Examples | 26 | 27 | 28 | 29 | 30 | 31 | 32 | 33 |
|---|---|---|---|---|---|---|---|---|
| Conditions of operation and results: | | | | | | | | |
| Catalyst system: | | | | | | | | |
| Ammonium persulfate, g | 0.1 | 0.25 | 0.5 | 0.5 | 0.5 | 0.5 | 0.5 | 2.5 |
| Water, g | 70 | 76 | 76.9 | 12.3 | 200 | 21 | 40 | 11 |
| Supports, g.: | | | | | | | | |
| Colloidal silica | 70 | 70 | 70 | 70 | 200 | | | 47 |
| Polyvinyl chloride | | | | | | 50 | 200 | |
| Ratio of weight of water to weight of support | | | | | | | | 0.234 |
| Conditions of polymerization: | | | | | | | | |
| Temperature, °C | 55–57 | 55–57 | 55–57 | 55–57 | 55 | 55–56 | 55–56 | 55 |
| Effective pressure, kg./sg. cm | 7 | 7.2 | 7.2 | 7.2 | 7.5 | 7.2 | 7.2 | 7 |
| Speed of agitation, r.p.m | 240 | 240 | 240 | 240 | 240 | 240 | 240 | |
| Period of polymerization, h | 2 | 2 | 2 | 2 | 2 | 4.78 | 6 | 1 |
| Polymer product*: | | | | | | | | |
| Quantity, g | 14 | 50.5 | 157 | 56.5 | 11 | 199.5 | 392 | 52 |
| Quantity per hour, g./h | | | | | | | | 52 |
| Appearance | | | | | Powder | | | |

*Quantity of support deducted.

What we claim as new and desire to secure by Letters Patent is:

1. Process for the homopolymerization of a vinyl monomer selected from the group c onsisting of vinyl chloride, vinyl acetate, styrene, acrylonitrile and alkyl acrylate and methacrylate and for the copolymerization of vinyl chloride with monomers selected from a member of the group consisting of vinylidene halide, vinyl ester, an aromatic vinyl monomer, acrylic monomer, olefin and vinyl fluoride in mass or in the gaseous phase which comprises carrying out said polymerization and copolymerization in the presence of a water-soluble polymerization catalyst selected from the group consisting of alkali metal and ammonium persulfate, perborate and percarbonate, said polymerization catalyst being mixed with an inert support and about 0.02 to 1.5 parts by weight of water per part by weight of said support, the resultant polymer thereby being obtained in a desired consistency varying from powder to a moist cake.

2. Process according to claim 1 in which said support is permeated with an aqueous solution of the said catalyst and in which the ratio of the quantity of water to the quantity of support is about 0.05 to 1.1.

3. Process according to claim 1 in which said inert support is a reinforcing material which adds strength to the resin product.

4. Process for polymerization according to claim 1 in which said support is permeated with an aqueous solution of said catalyst and in which said support is selected from the group consisting of colloidial silica, glass fibers, nylon fibers, asbestos fibers, calcium carbonate and a vinyl polymer.

5. Process according to claim 1 in which vinyl chloride is copolymerized with an olefin.

6. Process according to claim 1 in which the vinyl monomer, selected from the group consisting of vinyl chloride, styrene, acrylonitrile, alkyl acrylate and alkyl methacrylate, is homopolymerized.

* * * * *